(12) United States Patent
John et al.

(10) Patent No.: US 10,670,098 B2
(45) Date of Patent: Jun. 2, 2020

(54) MONITORING DEVICE FOR A DISK BRAKE OF A MOTOR VEHICLE

(71) Applicant: WABCO Europe BVBA, Brussels (BE)

(72) Inventors: Michael John, Lehrte (DE); Martin Stumpf, Lampertheim (DE)

(73) Assignee: WABCO EUROPE BVBA, Brussels (BE)

( * ) Notice: Subject to any disclaimer, the term of this patent is extended or adjusted under 35 U.S.C. 154(b) by 41 days.

(21) Appl. No.: 15/749,507

(22) PCT Filed: Jul. 23, 2016

(86) PCT No.: PCT/EP2016/001286
§ 371 (c)(1),
(2) Date: Feb. 1, 2018

(87) PCT Pub. No.: WO2017/063723
PCT Pub. Date: Apr. 20, 2017

(65) Prior Publication Data
US 2018/0223934 A1 Aug. 9, 2018

(30) Foreign Application Priority Data
Oct. 12, 2015 (DE) .................. 10 2015 013 199

(51) Int. Cl.
*F16D 66/02* (2006.01)
*F16D 66/00* (2006.01)
*F16D 65/56* (2006.01)

(52) U.S. Cl.
CPC .......... *F16D 66/00* (2013.01); *F16D 65/567* (2013.01); *F16D 66/021* (2013.01); *F16D 2066/003* (2013.01)

(58) Field of Classification Search
CPC .... F16D 66/023; F16D 66/025; F16D 66/026; F16D 66/027; F16D 66/022;
(Continued)

(56) References Cited
U.S. PATENT DOCUMENTS 6,047,793 A * 4/2000 Hasegawa ............... F16D 55/40
188/1.11 L
2003/0024773 A1* 2/2003 Goncalves .............. F16D 66/00
188/1.11 E
(Continued)

FOREIGN PATENT DOCUMENTS

DE 102005022597 A1 * 11/2006 ....... F16D 55/22655
DE 102012006088 A1 * 9/2013 ........... F16D 55/226
(Continued)

*Primary Examiner* — Bradley T King
*Assistant Examiner* — Stephen M Bowes
(74) *Attorney, Agent, or Firm* — Leydig, Voit & Mayer, Ltd.

(57) ABSTRACT

A monitoring device for a disk brake includes a sensor configured to be attached to a brake caliper of the disk brake; and a measuring element configured to be moved relative to the sensor unit. The sensor is designed to register a relative position of the measuring element. The sensor and the measuring element are spaced from one another for the purpose of forming a contactless monitoring device. The preloading element is arranged between the measuring element and the sensor for preloading the measuring element against a pressure spindle of the disk brake.

16 Claims, 4 Drawing Sheets

(58) Field of Classification Search
CPC .. F16D 66/021; F16D 66/028; F16D 55/2255;
F16D 65/56; F16D 65/563
USPC .......................................... 73/121, 128, 129
See application file for complete search history.

(56) References Cited

U.S. PATENT DOCUMENTS

| | | | |
|---|---|---|---|
| 2005/0121265 A1 | 6/2005 | Deckhut et al. | |
| 2017/0167556 A1* | 6/2017 | Knoop | F16D 65/42 |
| 2018/0017119 A1* | 1/2018 | Hufnagel | F16D 66/021 |
| 2019/0072146 A1* | 3/2019 | Jungmann | F16D 65/18 |

FOREIGN PATENT DOCUMENTS

| | | | | |
|---|---|---|---|---|
| DE | 102012006088 A1 | | 9/2013 | |
| DE | 102012006105 A1 | * | 9/2013 | ........... F16D 55/226 |
| DE | 102012017961 A1 | * | 3/2014 | ....... F16D 55/22655 |
| EP | 1633992 B1 | | 4/2009 | |
| EP | 1538364 B1 | | 11/2009 | |
| JP | 2006213080 A | | 8/2006 | |
| WO | WO 2013124247 A1 | | 8/2013 | |

\* cited by examiner

MONITORING DEVICE FOR A DISK BRAKE OF A MOTOR VEHICLE

CROSS REFERENCE TO RELATED APPLICATIONS

This application is a U.S. National Stage Application under 35 U.S.C. § 371 of International Application No. PCT/EP2016/001286 filed on Jul. 23, 2016, and claims benefit to German Patent Application No. DE 10 2015 013 199.0 filed on Oct. 12, 2015. The International Application was published in German on Apr. 20, 2017 as WO 2017/063723 A1 under PCT Article 21(2).

FIELD

The invention relates to a monitoring device for a disk brake, for monitoring a relative position of a brake pad of the disk brake, and also to a disk brake, in particular for a motor vehicle.

BACKGROUND

Disk brakes in motor vehicles exhibit brake pads which, depending on an actuation of a braking encoder, are pressed by a pressure spindle onto a brake disk connected to a wheel to be decelerated, in order to be able to transmit a braking action to the brake disk and the wheel. Brake pads of such a type wear out in the course of use of the disk brake—that is to say, their thickness decreases. As a result, a braking stroke of the brake pads—that is, the distance that the brake pads travel from a disengaged position, in which the braking encoder has not been actuated, into a braking position upon actuation of the braking encoder in order to obtain a braking action—is lengthened.

In order to obtain a rapid braking action with a short braking stroke also in the event of wear, an adjusting device—for instance, an adjusting gear mechanism—is provided, with which the decreasing thickness of the brake pads can be compensated, by the brake pads being repositioned closer to the brake disk again. As a result, roughly the original braking stroke can be set which is present in the case of new brake pads. If the brake pad is exchanged in the event of a certain wear, the adjusting device is reset—for instance, by a resetting tool—into the original starting position again, in order to re-adapt the braking stroke to the new pads.

In order also to be able to measure the wear, a monitoring device is provided which is operatively connected to the adjusting device in such a way that it registers an adjustment distance of the adjusting device, from which the wear follows directly.

EP 1 538 364 B1 discloses for this purpose a disk brake in which the pressure spindle with the brake pads can be brought closer to the brake disk by an adjusting gear mechanism, by the pressure spindle being unscrewed from a nut with increasing wear. In order to measure the wear and also the braking stroke, a wear-monitoring device is provided which is constituted by a longitudinally movable, spring-preloaded pin which is supported on a front side of the moving pressure spindle and is secured to the brake caliper of the disk brake in such a way that a movement of the pressure spindle is transmitted to the pin under spring loading.

If the pressure spindle is unscrewed from the nut for the purpose of compensating for the wear, the pin also moves relative to the brake caliper, and this can be registered optically or electrically. Furthermore, the pin is repositioned also in the event of an actuation of the brake, in the course of which the pressure spindle moves in the direction toward the brake disk (braking stroke). Consequently, relative displacements that result from the wear or from the braking stroke can be registered by the pin directly and in unfalsified manner. The registered relative displacements can be detected by a potentiometer, and the signals thereof can be processed further via an electrical connection.

A disadvantageous aspect of this solution is that the potentiometer of the wear-monitoring device for electrical registration of the movement of the pin has a limited service life, so that an exchange of the potentiometer may occur during the lifespan of the disk brake.

WO 2013124247 A1 presents a monitoring device for measuring an adjustment distance of an adjusting device. Accordingly, a gear wheel, which is seated on a shaft, meshes with the pressure spindle of the adjusting device, so that in the event of a rotation of the pressure spindle a rotation of the shaft is brought about. The rotation of the shaft can be registered by a monitoring device. For this purpose the monitoring device exhibits a portion with wedges and grooves, via which the rotation of the shaft is transmitted to a hollow shaft. The rotation of the hollow shaft is transmitted by a reduction gear to a rotary body. The rotary body takes the form of a two-pole magnet, the rotation of which is registered in contactless manner by a Hall sensor and can be converted into the corresponding adjustment distance or wear.

A disadvantageous aspect in this case is that very many components—in particular, wearing gear wheels for the reduction gear—are required in order to register the wear. In addition, the monitoring device is provided as an external device to be mounted and fastened on the housing of the brake caliper, as a result of which additional construction space on the brake caliper is needed. In addition, the braking stroke cannot be registered by the monitoring device in the event of actuation of the disk brake, since the adjusting device does not rotate in the course of braking.

A reset is guaranteed by an additional resetting tool which has to be inserted through the monitoring unit upon each reset in order to rotate the pressure spindle into its original starting position again; consequently a reset is elaborate, and a special tool is needed.

EP 1 633 992 B1 presents, furthermore, a monitoring device for monitoring the wear of a brake pad of disk brakes. Accordingly, a first sensor and a second sensor, taking the form of a monitoring device, are provided, the first sensor registering whether a deceleration obtains, and, depending thereon, the second sensor measuring the movement of the adjusting device in contactless manner.

For this purpose, inside the adjusting device a magnetic measuring element taking the form of a tube is provided which is fixed with respect to the brake pad and arranged around a Hall sensor in linearly repositionable manner. The length of the magnetic tube corresponds approximately to a maximally possible repositioning distance by which the brake pad can be repositioned in the course of braking (braking stroke) or by the adjusting device (adjustment distance). In contrast, the Hall sensor is constructed to be smaller, so that, depending on the position of the brake pad, the Hall sensor enters the tube to a greater or lesser depth and, as a result, depending upon the depth of entry into the tube, a corresponding signal is generated by the Hall sensor, from which the distance traveled by the brake pad can be ascertained.

A disadvantageous aspect in this case is that the measuring element takes the form of an elongated magnetic tube.

Making a tube of such a type magnetically homogeneous over a great length is a very elaborate process, so inaccuracies of measurement may occur if the magnetic field within the magnetic tube varies. In addition, introducing the elongated tube into the adjusting device is an elaborate process, so that exchange or retrofitting is associated with high assembly costs. Aligning the magnetic tube in the adjusting device with respect to the Hall sensor is also difficult.

Furthermore, for the purpose of identifying whether the output signal is specifying the braking stroke or the adjustment distance an additional signal transmission is necessary which specifies, depending on the result ascertained by the first sensor, whether or not a deceleration obtains—that is to say, whether a braking stroke or an adjustment distance is being output. Only with this additional signal can the downstream electronics decide whether a braking stroke or a wear is to be calculated.

SUMMARY

In an embodiment, the present invention provides a monitoring device for a disk brake. The monitoring device includes a sensor configured to be attached to a brake caliper of the disk brake; and a measuring element configured to be moved relative to the sensor unit. The sensor is designed to register a relative position of the measuring element. The sensor and the measuring element are spaced from one another for the purpose of forming a contactless monitoring device. The preloading element is arranged between the measuring element and the sensor for preloading the measuring element against a pressure spindle of the disk brake.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
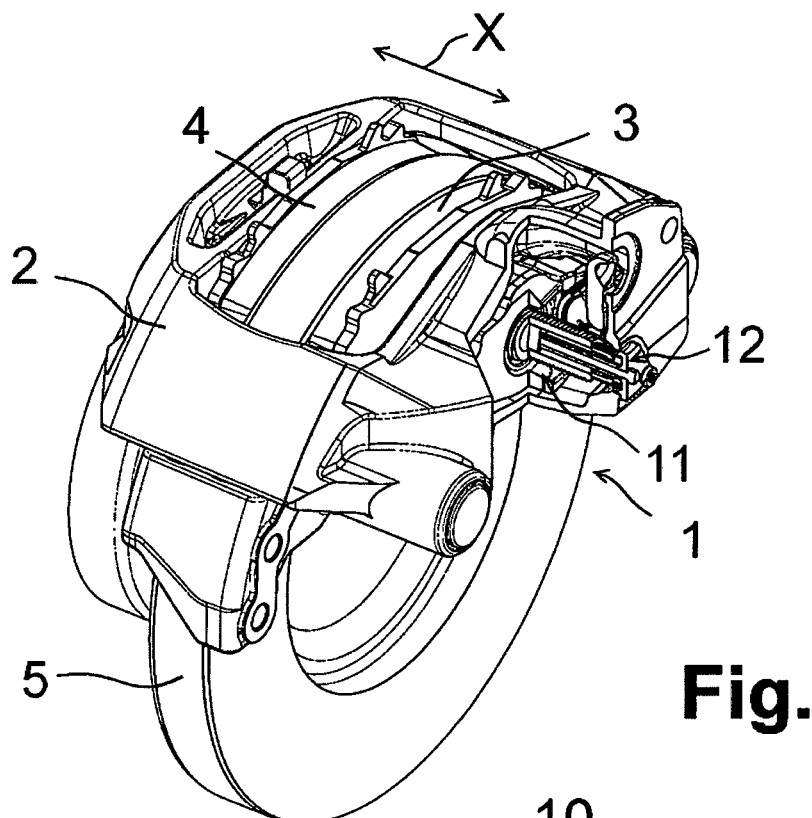
FIG. 1 depicts a disk brake in a perspective view.

Embodiments of the invention make available monitoring devices for disk brakes that are of simple construction and durable, and in addition, can be easily incorporated or retrofit into disk brakes. Furthermore, embodiments of the invention make available disk brakes in which a relative movement of a brake pad can be monitored in a straightforward manner and that have long service lives and which, in addition, are of simple construction.

Embodiments of the invention provide a contactless monitoring device which can be, for example, integrated into an adjusting device of a disk brake, wherein a measuring element of the monitoring device can be preloaded by a preloading element, for example, a spring, against a pressure spindle of the adjusting device which is connected to a brake pad. By "integrated" in this connection, it is understood that the monitoring device can interact with the adjusting device or with the pressure spindle and, by this, a repositioning of the brake pad can be registered.

As a result, the advantage that the measuring element does not have to be connected mechanically, for example by gluing, screwing or welding, to the adjusting device can be obtained, so that the incorporation of the measuring element, and consequently the capability for retrofitting and also the exchangeability, can be simplified. The measuring element may also be of variable construction, so that one and the same measuring element can be preloaded against differently dimensioned pressure spindles without a structural adaptation of the pressure spindle being required for this; the production costs can thereby be reduced.

Monitoring devices according to embodiments of the invention can exhibit, in particular, the measuring element and a sensor unit, the sensor unit being designed to register the relative position of the measuring element relative to the sensor unit in contactless manner. The sensor unit may in this case be fastened to the brake caliper or to elements that are fixed with respect to the brake caliper, and by virtue of the preloading the measuring element follows the movement of the pressure spindle with the brake pad fastened thereto, so that in the event of a movement of the brake pad relative to the brake caliper along a direction of motion the measuring element is repositioned by a measured distance relative to the sensor unit in a measuring direction running parallel to the direction of motion.

For this purpose the pressure spindle is preferentially constructed in the form of a hollow cylinder, and the sensor unit fastened to the brake caliper protrudes variably far, depending upon the repositioning of the brake pad relative to the brake caliper, into an interior space of the hollow cylinder. The entire monitoring device can advantageously also be installed on the disk brake retrospectively, by the sensor unit being fastened to the brake caliper and inserted into the interior space of the pressure spindle in such a way that the measuring element is automatically preloaded against the pressure spindle and in the process is already spaced from the sensor unit. In this case the measuring element may, for instance, abut a substantially annular front side of the hollow cylindrical pressure spindle and may in this connection exhibit an abutment surface that is suitable for varying ring diameters of the front side of the pressure spindle. For this purpose the abutment surface may, for instance, have been extended in such a way that it can be preloaded against front sides having varying ring diameters.

The front side of the pressure spindle, which the abutment surface of the measuring element abuts, may advantageously also be a front side which has been set back into the interior space of the hollow cylinder and which, for instance, can be made available by virtue of a stepped bore. As a result, space can be saved, since in the preloaded state the measuring element protrudes at least partly into the interior space of the pressure spindle, and therefore less space is taken up outwardly between the pressure spindle and the brake caliper.

As a result, a simple capability for retrofitting or exchangeability of the monitoring device can be guaranteed. Advantageously, the relative position of the measuring element relative to the sensor unit can be established already at the time of incorporation; consequently, after the incorporation merely fine adjustments between the two elements of the monitoring device are necessary; the assembly effort is consequently reduced.

For the purpose of obtaining the preloading, a preloading element, preferentially a spring, for example a coil spring, is provided which, for instance, may abut a region of the sensor unit that is fixed with respect to the brake caliper or preferentially may also directly abut the brake caliper and also a projection of the measuring element, and as a result presses the measuring element away from the brake caliper, for instance onto the front side—which, where appropriate, has also been set back into the interior space—of the pressure spindle. As a result, a movement of the pressure spindle can be transmitted to the measuring element directly. The coil spring preferentially surrounds the measuring element almost completely, and the sensor unit at least partly, so that a space-saving structure can be obtained, since no additional construction space extended in the direction of motion is required for the spring.

Consequently a preloading can be applied to the measuring element in straightforward manner, without great structural effort being necessary; the spring merely has to be suitably supported on an element that is fixed with respect to the brake caliper. If the spring is supported on a region of the sensor unit that is fixed with respect to the brake caliper, there is a vey simple capability for retrofitting of the monitoring device, since the spring is already in the correct position at the time of incorporation.

By virtue of the integration of the monitoring device into the adjusting device, space can advantageously be saved, since several interacting components have been installed in compact and space-saving manner without taking up additional construction space which increases the size of the disk brake. Furthermore, the interacting components are close together, so that movements toward one another do not have to be transmitted over long distances and via additional gear mechanisms or such like, and consequently fewer wearing components are necessary; the reliability of the monitoring device and of the disk brake increases.

By virtue of its integration within the adjusting device, the monitoring device is designed to register a relative position between the pressure spindle, or a brake pad fastened thereto, and the brake caliper directly in contactless manner. From the relative positions at different times, a movement or a distance traveled by the brake pad relative to the brake caliper can be inferred. The movement of the brake pad preferentially occurs in or contrary to a linear direction of motion toward a brake disk or away from the brake disk.

This movement is caused, in particular, in a manner depending on an actuation or a disengagement of a braking encoder, so that the distance traveled by the brake pad corresponds to a braking stroke—that is to say, the distance that the brake pad travels from a disengaged position, in which the braking encoder has not been actuated, into a braking position upon actuation of the braking encoder. Furthermore, the movement of the brake pad may also be caused by the adjusting device which compensates for a wear of the brake pad or for a fan clearance by the brake pad being displaced by an adjustment distance toward the brake disk in the direction of motion from a starting position into a wear position. The adjustment distance in this case corresponds approximately to the wear, so that the braking stroke with worn brake pads corresponds, again approximately, to the braking stroke with new brake pads. The distance traveled in this case is consequently the adjustment distance. Both movements can be registered by the monitoring device.

By "a contactless monitoring device" it is to be understood that the sensor unit and the measuring element do not act mechanically on one another—that is to say, at least during the measurement they are physically separated from one another. As a result, wear of the monitoring device can be minimized, and consequently the service life of the monitoring device can be increased, since in the event of a contactless movement relative to one another the components of the monitoring device are not worn away.

The sensor unit is preferentially constructed in the form of a cylinder, with the body of the cylinder protruding, in the event of corresponding repositioning of the brake pad, into the interior space of the pressure spindle in such a way that a small interspace remains between the cylinder body and the pressure spindle, so that the pressure spindle is able to move relative to the sensor unit. The length of the sensor unit corresponds to at least the maximum braking stroke or to the maximum adjustment distance or to a distance that is to be registered maximally by the monitoring device. Depending upon the application, the sensor unit can be constructed to be of variable length, depending upon which maximum distance is to be registered maximally. In this case an adaptation of the measuring element is not necessary.

The measuring element can be of substantially annular design—in which connection the shape is not limited thereto, and deviations from an annular shape are also possible—and preferentially envelops the sensor unit over its entire length, the length of the measuring element being shorter in comparison with the length of the sensor unit; for example, the length of the measuring element may correspond to one quarter or one fifth of the length of the sensor unit and may have been chosen in such a way that the two overlap merely in a small area—compared to the length of the sensor unit—or the measuring element acts on the sensor unit in contactless manner only in this small area.

In the sensor unit a Hall sensor or an inductive sensor is preferentially provided, and the measuring element has been at least partly manufactured from a magnetic material or exhibits a magnetic element—for example, one or more pins, extended in the direction of motion, made of a magnetic material which interacts with the Hall sensor or with the inductive sensor. Since the measuring element or the magnetic material has a short length, a higher accuracy of measurement can advantageously be obtained, since the formation of a homogeneous magnetic material of short length is less elaborate, and consequently fewer variations arise in the magnetic field. The length of the measuring element to be manufactured more elaborately is consequently also independent of the distance to be registered maximally by the monitoring device.

If the magnetic material of the measuring element is located within an effective range of the Hall sensor, a certain Hall voltage is generated by way of measuring signal, depending upon the relative position. In the case of an inductive sensor, a differential transformer (linear variable differential transformer, LVDT) consisting of several coils may for instance be used, the coupling or coupling coefficient of which varies in the case of a magnetic material located within the effective range. The coupling coefficient can be output by way of measuring signal. But it is also possible to use any other contactless sensor that can be integrated into the disk brake in the manner described above, for example an RF sensor for determining the distance with the aid of radio waves.

The respective measuring signal can be evaluated by the monitoring device or by an external processing unit, in order to determine the relative position or the change in the relative position of the measuring element relative to the sensor unit, and therefrom the relative position between the brake caliper and the brake pad, or the distance traveled by the brake pad.

The adjusting device preferentially further exhibits a pressure piece, into which the pressure spindle has been screwed. The pressure spindle then serves as mounting for the brake pad and can be moved by an arbitrary actuating device from the pressure piece toward the brake disk or away from it, in order to decelerate the brake disk in a manner depending on the actuation of the braking encoder. If the pressure spindle is additionally rotated against the pressure piece, the brake pad is displaced toward the brake disk or away from it, depending upon the direction of rotation. As a result, the adjustment distance can be set in a manner depending on the wear.

In addition, a resetting device may also have been integrated into the adjusting device, in order to cancel the compensation of the wear by the adjusting device—that is to say, to reset the worn brake pad or the pressure spindle into its starting position again. "Resetting" is therefore to be understood to mean displacing the adjusting device back into its original starting position without wear of the brake pad. As a result, particularly in the event of an exchange of the brake pads, the original braking stroke or a braking stroke adapted to the new brake pad can be set again.

By virtue of the integration of the resetting device within the adjusting device, advantageously no resetting tools to be plugged in retrospectively are necessary, as a result of which the assembly effort can be minimized. For this purpose the resetting device may, for instance, take the form of a resetting screw with a hexagon, which can be actuated by a conventional hexagonal wrench or hexagonal screw-wrench. Consequently, no additional special tools are necessary, as a result of which costs can be saved.

In order to integrate the resetting screw into the adjusting device, the sensor unit may, for instance, likewise be constructed in the form of a hollow cylinder, so that the resetting screw can be guided through the sensor unit and in the process protrudes into the interior of the pressure spindle. The resetting screw interacts there with the pressure spindle in such a way that the pressure spindle is rotated against the pressure piece in the course of a rotation of the resetting screw. By a corresponding rotation of the resetting screw, the adjusting device can consequently be reset to the starting position again. In this process the sensor unit remains substantially fixed—that is to say, the resetting screw is rotatably mounted in the hollow cylindrical sensor unit. As a result, a compact structure is advantageously possible, and no special tools are necessary for the resetting.

In FIG. 1 a disk brake 1 is shown in a perspective view. The disk brake 1 exhibits a brake caliper 2, brake pads 3, 4 and a brake disk 5 which is to be connected to a wheel to be decelerated and which is partly encompassed by the brake caliper 2. The brake pads 3, 4 are repositionable in a direction of motion X, so that, depending on a braking encoder which is not represented, the brake pads 3, 4 can be pressed against the brake disk 5 in order to bring about a deliberate deceleration in respect of the wheel to be decelerated.

Figure 2:
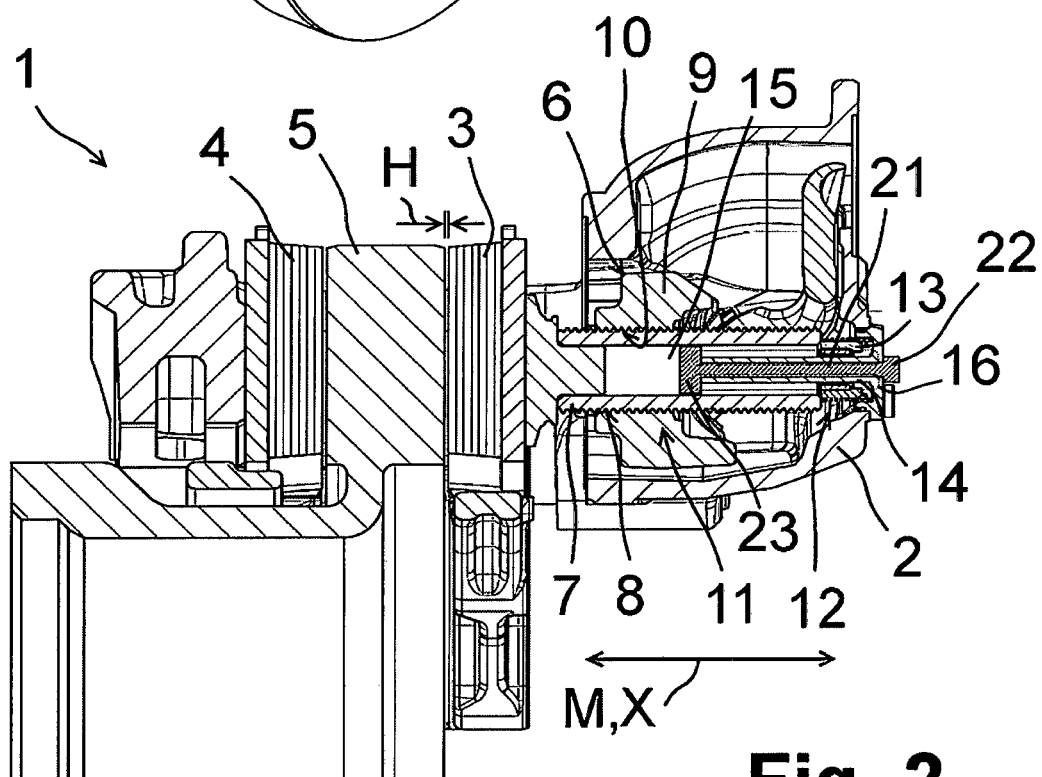
FIG. 2 depicts a detailed view of the disk brake according to FIG. 1 in a disengaged position.
Figure 3:
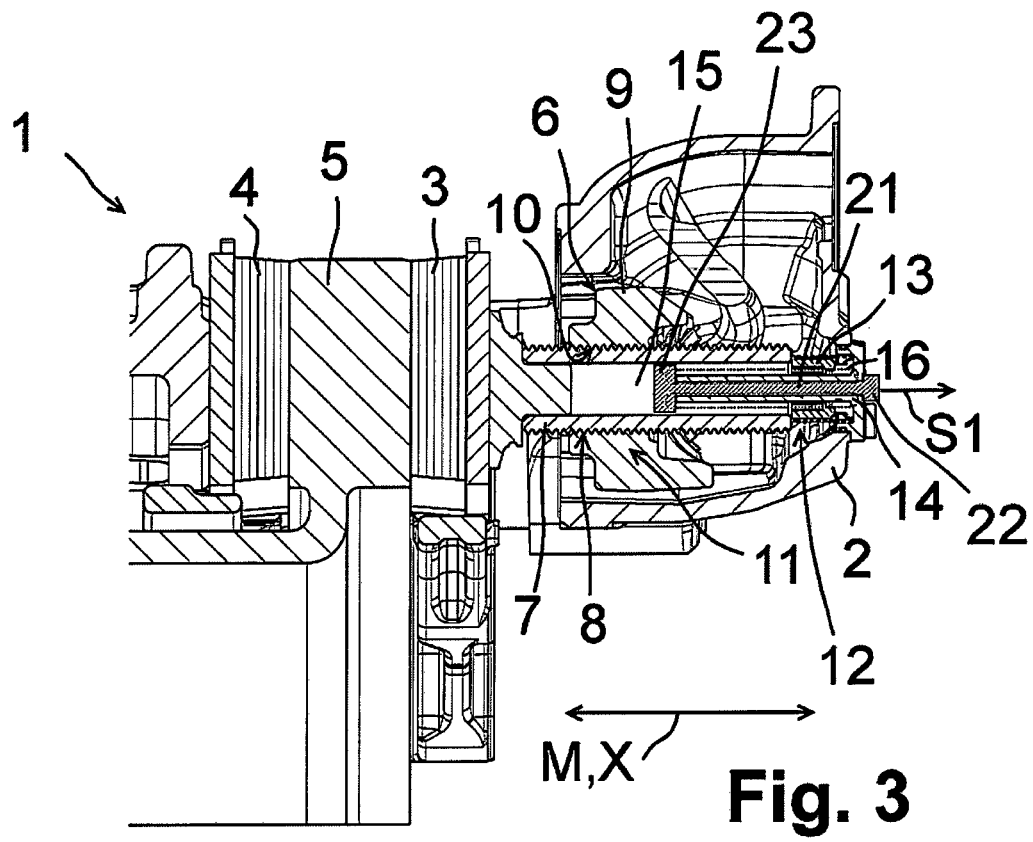
FIG. 3 depicts the disk brake according to FIG. 1 in a braking position.

FIG. 2 shows a simplified sectional view of the disk brake 1, wherein merely a relevant portion of the disk brake 1 is shown. In the disengaged position of the disk brake 1 the brake pads 3, 4 are remote from the brake disk 5 by a braking stroke H. The braking stroke H denotes the traveled distance that the brake pads 3, 4 travels from a disengaged position, in which the braking encoder has not been actuated, into a braking position, which is shown in FIG. 3, upon actuation of the braking encoder.

Figure 4:
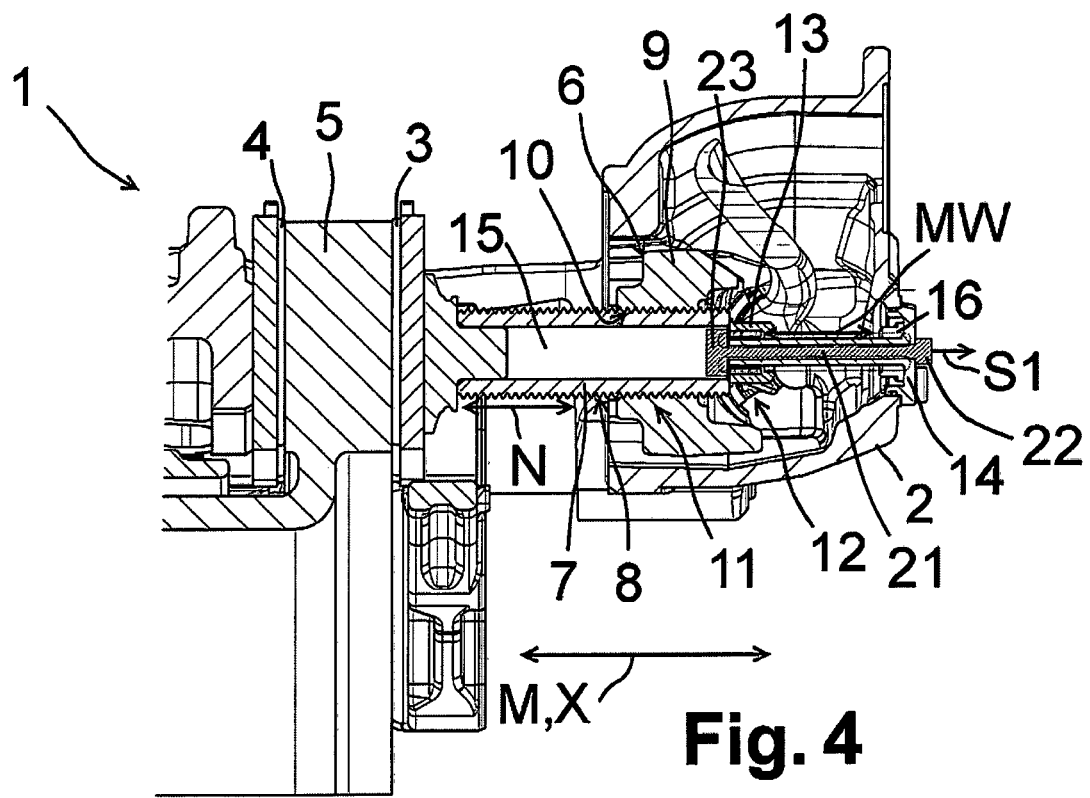
FIG. 4 depicts the disk brake according to FIG. 1 with worn brake pads in the braking position.

According to this version, the movement of the brake pads 3, 4 occurs along a linear direction of motion X which is defined by the pressure-spindle unit 6 mounted on the brake caliper 2 or on elements that are fixed with respect to the brake caliper. The pressure-spindle unit 6 exhibits a pressure spindle 7 with an external thread 8 and also a pressure piece 9 with an internal thread 10, so that an adjusting device 11 is formed. The pressure spindle 7 has been screwed into the pressure piece 9—that is to say, as a result of a rotation of the pressure spindle 7 with respect to the pressure piece 9 the pressure spindle 7 is repositioned in the direction of motion X, depending upon the direction of rotation, by an adjustment distance N, this being represented in FIG. 4.

This serves to compensate for a wear of the brake pad 3 connected to the pressure spindle 7, by the brake pad 3 being repositioned in the direction toward the brake disk 5 from a starting position into a wear position by an adjustment distance N compensating for the wear.

The pressure piece 9 further serves for actuation of the pressure-spindle unit 6 in a manner depending on the actuation of the braking encoder. If an actuation of the brake is predetermined by the braking encoder, the pressure piece 9 is moved toward the brake disk 5 in the direction of motion X by an arbitrary arrangement, so that the screwed-in pressure spindle 7, with the brake pad 3 connected thereto, also approaches the brake disk 5 and is pressed onto it in order to obtain a desired braking action. When the brake is released, the pressure piece 9 is moved back again, for instance by a spring preload which is not represented, so that the brake pad 3 is no longer touching the brake disk 5.

Consequently, upon an actuation of the brake the entire pressure-spindle unit 6 moves toward the brake disk 5. This movement takes place relative to the brake caliper 2 on which the pressure-spindle unit 6 is mounted so as to be displaceable in arbitrary manner.

In order to be able not only to compensate for the wear of the brake pad 3 but also to measure it, a monitoring device 12 is provided which has been integrated within the adjusting device 11—that is to say, it interacts with the adjusting device 11 and measures the relative position thereof with respect to the brake caliper 2. For this purpose the monitoring device 12 exhibits a measuring element 13 and a sensor unit 14. In the state according to FIG. 2, the sensor unit 14 protrudes at least partly into an interior space 15 in the pressure spindle 7 taking the form of a hollow cylinder and is fastened to the brake caliper 2. In the event of a repositioning of the brake pad 3, 4 or of the pressure spindle 7, the sensor unit 14 is displaced relative to the pressure spindle 7—that is to say, depending upon the repositioning of the brake pad 3, 4 the sensor unit 14 protrudes to varying depth into the interior space 15.

According to this version, the measuring element 13 is preloaded against the pressure spindle 7. For this purpose, according to FIG. 2a a coil spring 17 surrounding the measuring element 13 in the direction of motion X almost completely, and the sensor unit 14 at least partly, is provided by way of preloading element, which is supported, on the one hand, on a region 18 of the sensor unit 14 that is fixed with respect to the brake caliper and, on the other hand, on a projection 19 on the measuring element 13. By virtue of the spring tension of the coil spring 17, the measuring element 13 is pressed away from the brake caliper 2 onto a substantially annular front side 20 of the pressure spindle 7. As a result, the measuring element 13 follows the motion of the pressure spindle 7 toward the brake disk 5. In the course of an opposing movement of the pressure spindle 7, the latter pushes the measuring element 13 in the direction of the brake caliper 2 again, contrary to the spring force of the coil spring 17.

Figure 2A:
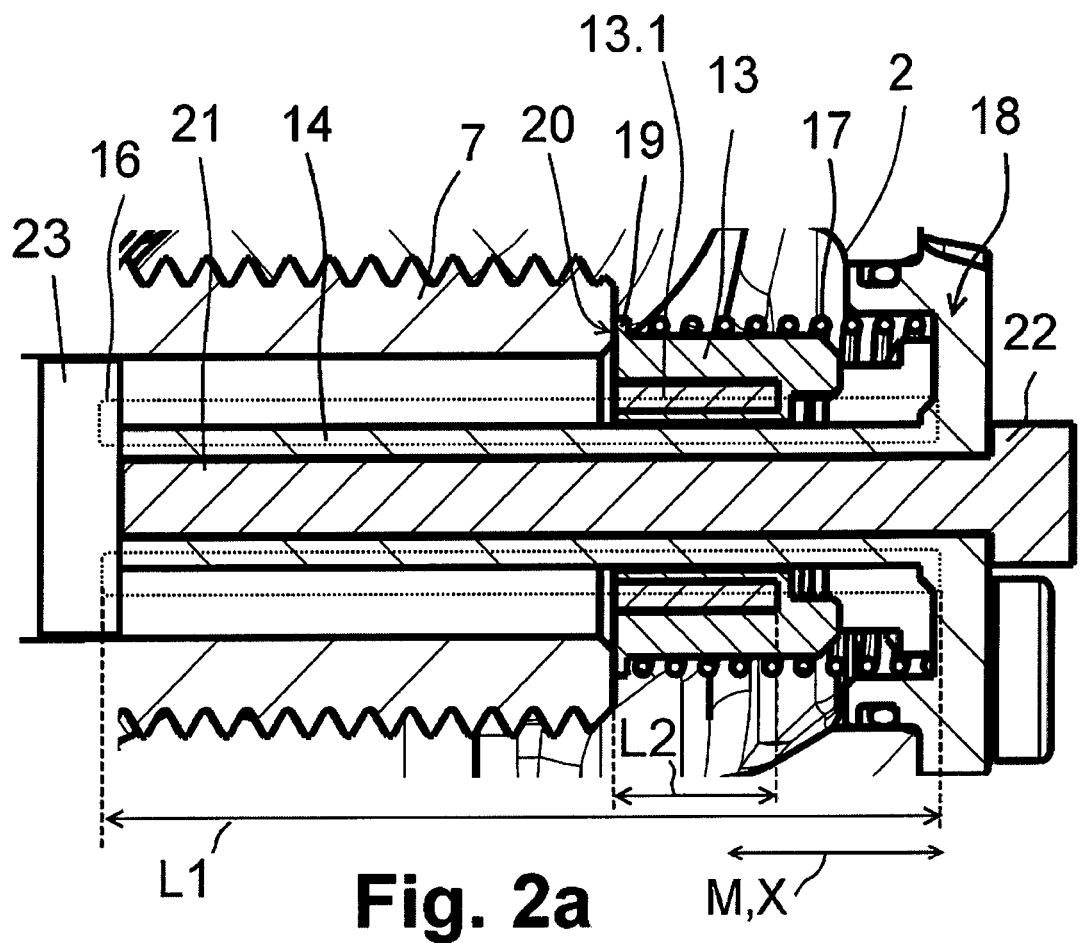
FIGS. 2a, 2b, 2c, and 2d depict detailed views of a monitoring device.
Figure 2B:
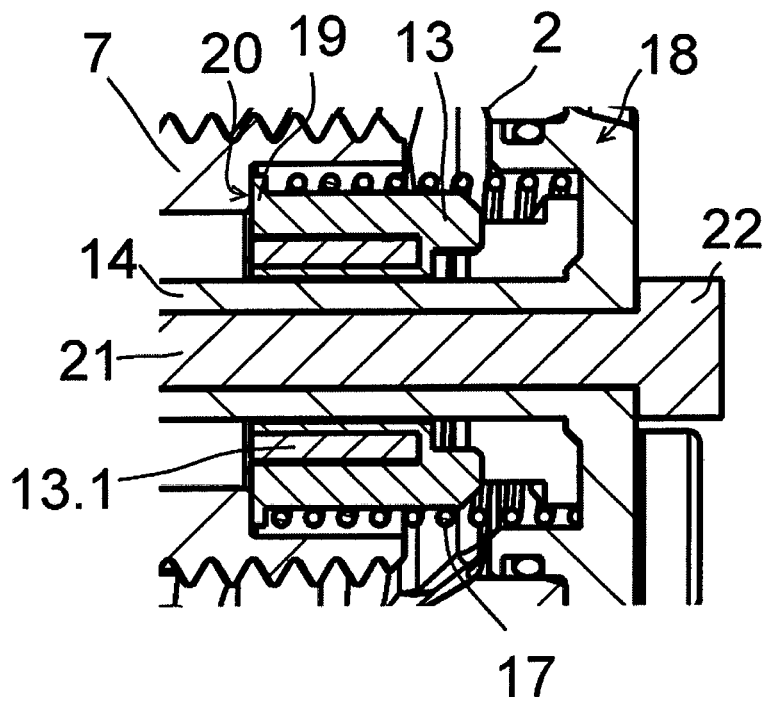
Figure 2C:
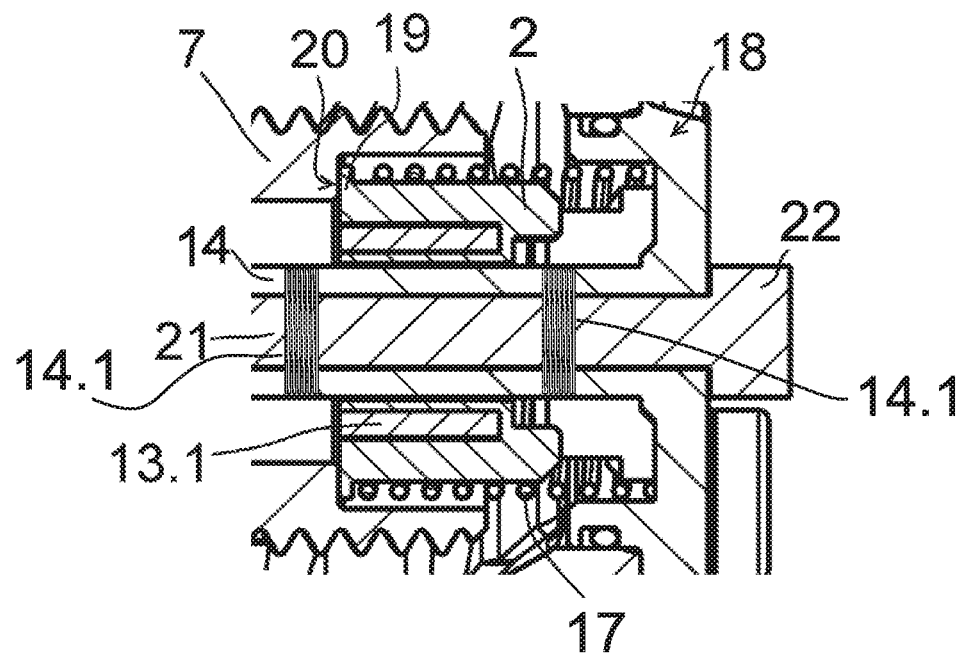
Figure 2D:
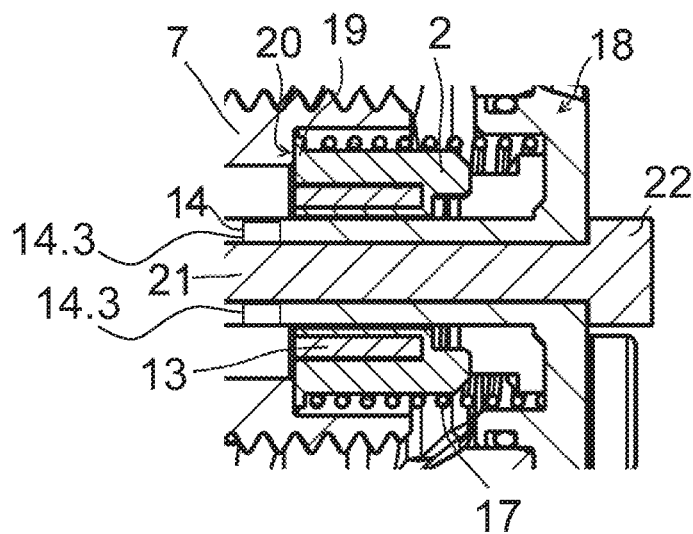

According to FIG. 2b, an alternative version is specified, wherein the substantially annular front side 20, against which the measuring element 13 is preloaded, has been set back into the interior space 15, so that, in contrast to the version shown in FIG. 2a, in the preloaded state the measuring element 13 protrudes further into the pressure spindle 7 and consequently less space is needed between the pressure spindle 7 and the brake caliper 2 or the region 18 that is fixed with respect to the brake caliper. According to FIG. 2c, an alternative version is specified, wherein the sensor unit 14 includes an inductive sensor 14.1. According to FIG. 2d, an alternative version is specified, wherein the sensor unit 14 includes an RF-sensor 14.3.

Consequently the measuring element 13 is moved relative to the sensor unit 14 along a measuring direction M parallel to the direction of motion X when the pressure spindle 7 is repositioned along the direction of motion X.

The sensor unit 14 is designed to register a relative position or a change in the relative position of the measuring element 13 relative to the sensor unit 14 as soon as the measuring element 13 is located within an effective range 16 of the sensor unit 14. The measurement is carried out in contactless manner—that is to say, the measuring element 13 and the sensor unit 14 do not touch one another. For this purpose the sensor unit 14 exhibits, for instance, one or more Hall sensors, and the measuring element 13 exhibits a magnetic element 13.1, for example one or more magnetic pins extended in the direction of motion X, which has been integrated into the measuring element 13. If the magnetic element 13.1 comes within the effective range 16 of the Hall sensor, which is determined by the sensitivity of the Hall sensor, a Hall voltage therein, which can be monitored and evaluated by electronics in the sensor unit 14, changes. From this, the relative position or a change in the relative position of the measuring element 13 relative to the sensor unit 14 can be determined, and, from this, a measured distance MW, represented in FIG. 4, traveled by the measuring element 13 relative to the sensor unit 14, for example by forming the difference between two relative positions. Via a measuring signal S1 the calculated values can be output for further processing to an external computing unit which is not represented.

But it is also possible to design the sensor unit 14 as an inductive sensor, in particular a differential transformer (linear variable differential transformer, LVDT), in which case the sensor unit 14 exhibits several coils for this purpose, and the measuring element 13 exhibits a magnetic core taking the form of a magnetic element 13.1. If the magnetic core is moved in the vicinity of the coils, a change happens in a coupling coefficient of the coils, which can be evaluated by the electronics of the sensor unit 14 in order to infer the measured distance MW.

Consequently a movement of the pressure spindle 7 can be deduced from the movement of the measuring element 13 along the measured distance MW, since the two have been connected to one another by the preloading. Since the measured distance MW is oriented almost parallel to the braking stroke H or to the adjustment distance N, the measured distance MW corresponds directly to one of the two quantities, depending upon the one from which the movement of the pressure spindle 7 follows. As a result, the distance traveled can be registered directly and can be output via the measuring signal S1, without complicated conversion of the measured distance MW.

From the registered braking stroke H it can be detected, for instance, whether the disk brake 1 is working properly and is traveling the predetermined braking stroke H both when the disk brake 1 is actuated and when it is disengaged. If, on the basis of the registered braking stroke H, it is detected by the monitoring device 12 or by an external processing device, which is not represented, that the expected braking stroke H was not traveled completely, it can be inferred, for instance, that the disk brake 1 is defective. As a result, a simple monitoring of the braking stroke H of the disk brake 1 can additionally be obtained.

According to this embodiment, the sensor unit 14 takes the form of a hollow cylinder, and the measuring element 13 is arranged around the sensor unit 14 in substantially annular manner, so that a spatial measurement, for instance via a 3D Hall sensor, is also possible. The sensor unit 14 has preferentially been manufactured from synthetic material, for example in an injection-molding process, and the electronics and sensors are embedded in the synthetic material and thereby protected against external influences.

A length L1 of the sensor unit 14 or of the effective range 16 of the sensor unit 14 corresponds to at least the maximum braking stroke H or the maximum adjustment distance N—that is, the maximum distance that is to be registered by the monitoring device 12. According to this version, a length L2 of the annular measuring element 13 or of the magnetic element 13.1 corresponds approximately to one fifth of the length L1 of the sensor unit 14, so that the measuring element 13 acts on the sensor unit 14 merely in a very small region compared to the length L1 of the sensor unit 14.

The maximum adjustment distance N of the pressure spindle 7 amounts to approximately 45 mm, so that the length L1 of the sensor unit 14 is at least of this order of magnitude, depending upon the application, but may also be shorter or longer. For this purpose, merely an adaptation of the sensor unit 14 is required, which then protrudes into the interior space 15 correspondingly more deeply or less deeply.

According to this embodiment, in the hollow cylindrical sensor unit 14 a resetting device taking the form of a resetting screw 21 is provided which protrudes through the sensor unit 14 into the interior space 15 of the pressure spindle 7. On the other side of the resetting screw a hexagon 22 is provided, with which the resetting screw 21 can be rotated with a corresponding hexagonal screw-wrench. In the interior space 15 the resetting screw 21 interacts with the pressure spindle 7 via a resetting mechanism 23 in such a way that in the course of a rotation of the resetting screw 21 via the hexagon 22 the pressure spindle 7 is rotated against the pressure piece 9, so that the pressure spindle 7 can be repositioned from the wear position into its starting position again, in which the brake pads 3, 4 can be exchanged.

For this purpose the resetting mechanism 23 can, for instance, engage the grooves of the pressure spindle 7 extending in the direction of motion X from the inside, so that upon a rotation of the resetting mechanism 23 the pressure spindle 7 is entrained via the grooves and consequently likewise rotates in the pressure piece 9.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS 1 disk brake
2 brake caliper
3, 4 brake pads
5 brake disk
6 pressure-spindle unit
7 pressure spindle
8 external thread
9 pressure piece
10 internal thread
11 adjusting device
12 monitoring device
13 measuring element
13.1 magnetic element
14 sensor unit
15 interior space
16 effective range of the sensor unit 14
17 coil spring
18 region fixed with respect to the brake caliper
19 projection
20 front side
21 resetting screw
22 hexagon
23 resetting mechanism
H braking stroke
L1 length of the sensor unit 14
L2 length of the measuring element 13
M measuring direction
MW measured distance
N adjustment distance
S1 measuring signal
X direction of motion

The invention claimed is:

1. A disk brake for a motor vehicle, comprising:
a brake disk;
a brake caliper encompassing the brake disk;
a brake pad configured to be repositionable, in a manner depending on an actuation of a brake actuator, relative to the brake caliper for the purpose of bringing about a deceleration of the brake disk, wherein the brake pad is fastened to a pressure spindle of an adjusting device for the purpose of additional repositioning of the brake pad in a manner depending on a wear of the brake pad; and
a monitoring device, integrated within the adjusting device, configured to register a relative position between the pressure spindle and the brake caliper, the monitoring device including:
a sensor assembly configured to be attached to a brake caliper of the disk brake, and
a measuring assembly configured to be moved relative to the sensor assembly,
wherein the measuring assembly of the monitoring device is preloaded against the pressure spindle for the purpose of transmitting a movement of the pressure spindle to the measuring assembly,
wherein the pressure spindle is constructed in the form of a hollow cylinder,
wherein the measuring assembly is preloaded against a substantially annular front side of the pressure spindle, wherein the sensor assembly protrudes, in a manner depending on the relative position between the brake caliper and the pressure spindle, into an interior space in the hollow cylindrical pressure spindle, and
wherein the pressure spindle has been rotatably screwed into a pressure piece, and in the course of a rotation against the pressure piece the pressure spindle is repositionable by an adjustment distance (N) from a starting position into a wear position for the purpose of compensating for the wear of the brake pad.

2. The disk brake as claimed in claim 1, wherein the monitoring device is configured to be integrated into an adjusting device of the disk brake.

3. The disk brake as claimed in claim 1, wherein the measuring assembly surrounds the sensor assembly in an annular manner.

4. The disk brake as claimed in claim 1, wherein the preloading is obtained by a spring.

5. The disk brake as claimed in claim 4, wherein the spring is a coil spring which at least partly surrounds the sensor assembly and the measuring assembly along the direction of adjustment motion (X).

6. The disk brake as claimed in claim 4, wherein the spring extends between a region, fixed with respect to the brake caliper, on the sensor assembly and the measuring assembly for the purpose of obtaining the preloading of the measuring assembly.

7. The disk brake as claimed in claim 1, wherein a resetting device is further provided for resetting the pressure spindle from the wear position back into the starting position, and wherein the resetting device is integrated within the adjusting device.

8. The disk brake as claimed in claim 7, wherein the resetting device includes a resetting mechanism which interacts with the pressure spindle in such a way that a rotation of the resetting device brings about a rotation of the pressure spindle in the pressure piece for the purpose of resetting the pressure spindle from the wear position back into the starting position.

9. The disk brake as claimed in claim 1, wherein the sensor assembly includes one or more sensors,
wherein the measuring assembly includes a sensed object,
wherein the one or more sensors are configured to determine a relative position of the measuring assembly, and
wherein the one or more sensors and the sensed object are spaced apart from one another.

10. The disk brake as claimed in claim 9, wherein the measuring assembly partly surrounds the one or more sensors along a direction of adjustment motion (X) of the pressure spindle, and wherein a length (L2) of the sensed object in the direction of adjustment motion (X) is shorter than a length (L1) of a sensing range of the one or more sensors in the direction of adjustment motion (X).

11. The disk brake as claimed in claim 9, wherein the one or more sensors have a sensing range that protrudes, in a manner depending on the relative position between the brake caliper and the pressure spindle, into an interior space in the hollow cylindrical pressure spindle.

12. The disk brake as claimed in claim 9, wherein the one or more sensors are one or more Hall sensors, and wherein the sensed object includes a magnetic material configured to bring about a change of voltage in the one or more Hall sensors in a manner depending on the position of the measuring assembly relative to the one or more Hall sensors.

13. The disk brake as claimed in claim 9, wherein the one or more sensors are one or more inductive sensors with several coils, and wherein the sensed object includes a magnetic material configured to change an electromagnetic coupling coefficient of the several coils of the one or more inductive sensors in a manner depending on the position of the measuring assembly relative to the one or more inductive sensors.

14. The disk brake as claimed in claim 9, wherein the one or more sensors include an RF sensor configured to determine the relative position of the measuring assembly with radio waves.

15. A disk brake for a motor vehicle, comprising:
a brake disk;
a brake caliper encompassing the brake disk;
a brake pad configured to be repositionable, in a manner depending on an actuation of a braking actuator, relative to the brake caliper for the purpose of bringing about a deceleration of the brake disk, wherein the brake pad is fastened to a pressure spindle of an adjusting device for the purpose of additional repositioning of the brake pad in a manner depending on a wear of the brake pad; and
a monitoring device, integrated within the adjusting device, configured to register a relative position between the pressure spindle and the brake caliper, the monitoring device including:
a sensor assembly, including a sensor, configured to be attached to a brake caliper of the disk brake, and
a measuring assembly configured to be moved relative to the sensor unit,
wherein the measuring assembly of the monitoring device is preloaded against the pressure spindle for the purpose of transmitting a movement of the pressure spindle to the measuring assembly,
wherein the pressure spindle has been rotatably screwed into a pressure piece, and in the course of a rotation against the pressure piece the pressure spindle is repositionable by an adjustment distance (N) from a starting position into a wear position for the purpose of compensating for the wear of the brake pad,
wherein a resetting device is further provided for resetting the pressure spindle from the wear position back into the starting position,
wherein the resetting device is integrated within the adjusting device, and
wherein the resetting device is at least partly surrounded by the monitoring device.

16. The disk brake as claimed in claim 15, further comprising a spring extending between a region, fixed with respect to the brake caliper, on the sensor assembly and the measuring assembly for the purpose of obtaining the preloading of the measuring assembly against the pressure spindle.

* * * * *